US008122242B2

(12) United States Patent
Elliott

(10) Patent No.: US 8,122,242 B2
(45) Date of Patent: *Feb. 21, 2012

(54) METHOD AND APPARATUS FOR CONTROLLING THE FLOW OF DATA ACROSS A NETWORK INTERFACE

(75) Inventor: Brig Barnum Elliott, Arlington, MA (US)

(73) Assignees: Verizon Corporate Services Group Inc., Basking Ridge, NJ (US); Raytheon BBN Technologies Corp., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/210,786

(22) Filed: Sep. 15, 2008

(65) Prior Publication Data
US 2009/0013175 A1 Jan. 8, 2009

Related U.S. Application Data

(63) Continuation of application No. 10/391,582, filed on Mar. 19, 2003, now Pat. No. 7,441,267.

(51) Int. Cl.
*H04L 29/06* (2006.01)

(52) U.S. Cl. ....................................... 713/154

(58) Field of Classification Search .......... 713/150–154, 713/168–172; 726/11–14; 380/255–257, 380/277, 44, 28; 370/229, 254, 351; 709/238–244, 709/220, 222, 227
See application file for complete search history.

(56) References Cited

U.S. PATENT DOCUMENTS

| | | | |
|---|---|---|---|
| 5,459,717 A | 10/1995 | Mullan et al. | |
| 5,915,025 A * | 6/1999 | Taguchi et al. | 380/44 |
| 6,240,514 B1 | 5/2001 | Inoue et al. | |
| 6,295,361 B1 | 9/2001 | Kadansky et al. | |
| 6,317,831 B1 | 11/2001 | King | |
| 6,463,068 B1 * | 10/2002 | Lin et al. | 370/414 |
| 6,463,537 B1 | 10/2002 | Tello | |
| 6,510,349 B1 | 1/2003 | Schneck et al. | |
| 6,578,086 B1 | 6/2003 | Regan et al. | |
| 6,594,268 B1 * | 7/2003 | Aukia et al. | 370/400 |
| 6,643,698 B2 * | 11/2003 | Holden et al. | 709/225 |
| 6,690,798 B1 | 2/2004 | Dent | |
| 6,744,774 B2 | 6/2004 | Sharma | |

(Continued)

OTHER PUBLICATIONS

Fransom, J.D., "Violations of a New Inequality for Classical Fields", Johns Hopkins University, NTIS-NASA Publication, Goddard Space Flight Center, Workshop on Squeezed States and Uncertainty Relations, Feb. 1991, pp. 23-32.

(Continued)

*Primary Examiner* — Nirav B Patel

(57) ABSTRACT

The present invention performs "flow control" based on the remaining encryption capacity of an encrypted outbound network interface link of a network routing device, such as a router or switch. As the encrypted link begins to run low on encryption key material, this invention begins to discard datagrams queued for transit across that link, in order to signal distant host computers that they should slow down the rate at which they are sending datagrams. The invention, which is particularly useful in cryptographically protected networks that run the TCP/IP protocol stack, allows fine-grained flow control of individual traffic classes because it can determine, for example, how various classes of data traffic (e.g., voice, video, TCP) should be ordered and transmitted through a network. Thus, the invention can be used to implement sophisticated flow control rules so as to give preferential treatment to certain people, departments or computers.

23 Claims, 10 Drawing Sheets

U.S. PATENT DOCUMENTS

| | | | |
|---|---|---|---|
| 6,850,524 | B1 | 2/2005 | Troxel et al. |
| 6,895,091 | B1 | 5/2005 | Elliott et al. |
| 6,967,958 | B2* | 11/2005 | Ono et al. ............... 370/401 |
| 6,976,087 | B1* | 12/2005 | Westfall et al. ............... 709/238 |
| 6,980,659 | B1 | 12/2005 | Elliott |
| 7,006,633 | B1 | 2/2006 | Reece |
| 7,035,216 | B2* | 4/2006 | Kikuchi et al. ............... 370/235 |
| 7,068,790 | B1 | 6/2006 | Elliott |
| 7,069,342 | B1* | 6/2006 | Biederman ............... 709/247 |
| 7,219,223 | B1 | 5/2007 | Bacchus et al. |
| 7,313,234 | B2* | 12/2007 | Takagaki et al. ............... 380/28 |
| 7,386,705 | B2* | 6/2008 | Low et al. ............... 712/34 |
| 2001/0005885 | A1* | 6/2001 | Elgamal et al. ............... 713/164 |
| 2002/0087724 | A1* | 7/2002 | Datta et al. ............... 709/241 |
| 2003/0002674 | A1 | 1/2003 | Nambu et al. |
| 2003/0149883 | A1* | 8/2003 | Hopkins et al. ............... 713/191 |
| 2004/0120528 | A1 | 6/2004 | Elliott et al. |
| 2004/0196808 | A1 | 10/2004 | Chaskar et al. |

OTHER PUBLICATIONS

Perlman, Radia. Interconnections: Bridges, Routers, Switches and Internetworking Protocols (Second Edition). Chaps. 10,12,14,16,17 and 18. Addison Wesley, 2000.

Stevens, W. Richard. TCP/IP Illustrated, vol. 1: The Protocols. Addison-Wesley, 1994.

Shneier, Bruce. Applied Cryptography: Protocols, Algorithms and Source Code in C (Second Edition). John Wiley & Sons, Inc., 1996.

Floyd, S., and Jacobson, V., Random Early Detection gateways for Congestion Avoidance. V.I.N.4, Aug. 1993, p. 397-413. Abstract.

Braden B., Clark, D., Crowcroft, J., Davie, B., Deering, S., Estrin, D., Floyd, S., Jacobson, V., Minshall, G., Partridge, C., Peterson, L, Ramakrishnan, K, Shenker, S., Wroclawski, J., Zhang, L. Recommendations on Queue Management and Congestion Avoidance in the Internet. Apr. 1998.

Floyd, S., and Fall, K. Promoting the Use of End-to-End Congestion Control in the Internet. IEEE/ACM Transactions on Networking, vol. 7, No. 4. Aug. 1999.

Elloumi, O., and Afifi, H., Red Algorithm in ATM Networks. IEEE Tech Report, Jun. 1997.

Lin, D. and Morris, R., Dynamics of Random Early Detection. Proceedings of SIGCOMM '97. Sep. 1997.

Feng, W. Kandlur, D., Saha, D., Shin, K, Techniques for Eliminating Packet Loss in Congested TCP/IP Networks, U. Michigan CSE-TR-349-97, Nov. 1997.

Jacobson, V., Notes on using RED for Queue Management and Congestion Avoidance. Nanog 13 Viewgraphs. Dearborn, MI. Jun. 1998.

Rosolen, V., Bonaventure, O., and Leduc, G. A RED Discard Strategy for ATM Networks and its Performance Evaluation with TCP/IP Traffic, Proceedings of the 6th Workshop on Performance Modelling and Evaluation of ATM Networks (IFIP ATM '98) Ilkley, UK, Jul. 1998.

Cisco IOS Software Releases 12.2: Configuring Weighted Random Early Detection, URL: http://www.cisco.com/univercd/cc/td/doc/product/software/ios122/122cgcr/fqos_c/fqcprt3/qcfwred.pdf, Printed Jan. 10, 2003.

* cited by examiner

METHOD AND APPARATUS FOR CONTROLLING THE FLOW OF DATA ACROSS A NETWORK INTERFACE

RELATED APPLICATIONS

This is a continuation of prior co-pending U.S. patent application Ser. No. 10/391,582, filed Mar. 19, 2003, titled "METHOD AND APPARATUS FOR CONTROLLING THE FLOW OF DATA ACROSS A NETWORK INTERFACE." This application is related to an application entitled, METHOD AND APPARATUS FOR ROUTING DATA TRAFFIC IN A CRYPTOGRAPHICALLY PROTECTED NETWORK, application Ser. No. 10/392,492, filed on the same date as U.S. patent application Ser. No. 10/391,582, and issued as U.S. Pat. No. 7,392,378 on Jun. 24, 2008, and assigned to the assignee of the present application. The above-identified applications are incorporated herein in their entireties.

STATEMENT REGARDING FEDERALLY SPONSORED RESEARCH OR DEVELOPMENT

This invention was made with Government support under Contract No. F30602-01-C-0170, awarded by Defense Advanced Research Projects Agency. The Government has certain rights in this invention.

BACKGROUND OF THE INVENTION

1. Field of Art

The present invention relates generally to the field of data communications networks, and more particularly to data communications networks protected by cryptographic techniques (e.g., encryption). Still more particularly, the present invention relates to systems and methods for controlling the flow of data traffic in cryptographically-protected data communications networks.

2. Related Art

Data communications networks are typically comprised of a set of nodes (e.g., computers, routers and/or switches) connected by a set of interface links (e.g., wires, cable, fiber, microwave or radio wave channels, etc.). In a data communications network, a node is a connection point, either a redistribution point or an end point, for data transmissions. In general, a node (especially if the node is a switch or router) has a programmed or engineered capability to recognize, process and/or forward data traffic to other nodes.

A "router" is a device or, in some cases, software in a computer, that determines the next connection point to which a packet of data should be forwarded toward its final destination. A router is connected to at least two network interface links and determines which way to send each data packet based on its current understanding of the state of the links to which it is connected. A router may be located at any network gateway (where one network meets another), including, for example, host computers and points-of-presence on the Internet. Put another way, a router is a device or program that determines the route and specifically to which adjacent connection point in a network a data packet should be sent.

A router is often included as part of a network "switch," which is also a network device that selects a path or circuit for sending a packet of data to its next destination. In general, however, a switch is a simpler and faster mechanism than a router. A router may create or maintain a table of available routes and their conditions and use this information, along with distance and cost algorithms, to determine the best route for a given data packet. Routers and switches may both be configured to implement schemes to control the network links used to transmit data packets to their destinations, as well as the order and speed in which data or data packets flow over a given link. However, switches are generally less sophisticated than routers in terms of the algorithms and the quantity and quality of network information it uses.

Often the links in a data communications network are "weighted" or assigned numeric values to reflect some functional, qualitative or quantitative aspect of each link, such as its capacity to transmit data traffic. These numeric values are often called link metrics. Conventional routers and switches use algorithms based on link metrics to determine the "best path" to send a data packet to its intended destination. Several well-known algorithms, such as Shortest Path First Routing (sometimes called Link State Routing), or Distance Vector Routing, and their many variants, for example, have been advantageously applied in the data communications industry to optimize routing of data traffic through data communications networks.

Some types of secure networks employ a technique called "link encryption." Link encryption (also called "link level encryption" or "link layer encryption") is a data security process for encrypting information at the data link level as it is transmitted between two points within a data communications network. In such networks, a data packet is considered to exist "in the clear" while it is still located in a first network routing device's memory. The data packet is encrypted before it is sent across the link from this first network routing device to a second network routing device, and then is decrypted as it is received at the second network routing device. It is again considered to be "in the clear" when it arrives in an unencrypted state in the second network routing device's memory. A given data packet may thus proceed hop by hop through the data communications network, being encrypted before it is sent across each link, and then decrypted after it is received from that link.

The actual link encryption and decryption of the data is generally performed by cryptographic devices and/or algorithms, known as "cryptos." Link encryption typically requires a pair of collaborating cryptos—one at each end of a link. Cryptos may reside in the router, the switch or elsewhere in the data communications network as stand-alone devices, computers or computer programs.

In most cases, a pair of collaborating cryptos will share a secret encryption "key." An encryption key typically comprises a variable value that is applied (according to an algorithm usually) to a string or block of unencrypted data to produce encrypted data, or applied to a string or block of encrypted data to produce unencrypted data. The length or number of bits in the encryption key is usually a significant factor in how difficult it will be for an unauthorized recipient of a an encrypted data packet to decrypt the data packet. Typically, an "upstream" crypto will use the encryption key to encrypt a packet's contents before the packet is transmitted across the link, and a "downstream" crypto will use the same encryption key to decrypt the packet upon receipt.

Often it is deemed undesirable to use the same encryption key for too long a period of time because the more traffic encrypted with a single encryption key, the easier the encryption code is to break. If an unauthorized person breaks the encryption code, then the security and/or integrity of the data traffic may be compromised. The more data traffic that has been encrypted with a given key, the more data traffic will be compromised if that encryption code is broken. Thus, encryption keys are often changed from time to time, e.g., weekly, daily, or even from minute to minute. Usually, when a key is changed, it must be changed at both the upstream and downstream cryptos. One approach is to change keys after a certain number of traffic bytes have passed through the crypto. For example, the two cryptos might be configured so that they switch to new encryption keys once five megabytes of data traffic has been encrypted (and/or decrypted) under the previous key. Alternatively, the keys may be updated periodically, for example once per hour. When using one of these approaches, the term "remaining encryption capacity" may be used to refer to the number of additional bytes of data traffic that can be encrypted, or the remaining amount of time that encryption may be applied on a link before all of the keys or key material currently on hand will be exhausted.

In the data communications network industry, many different techniques are used to supply cryptos with encryption keys. One common technique, appropriately termed "sneaker net," is to have a trusted person carry the keys in some kind of physical container (such as a laptop computer or more specialized device) from one crypto to another. Another common technique employs mathematical algorithms and specialized cryptographic protocols, such as the well-known Diffie-Hellman Key Exchange Technique. A third technique that is now becoming more popular is quantum cryptography.

Quantum cryptography differs from traditional cryptographic systems in the sense that it depends more on physics, rather than mathematics, as the central aspect of its security model. Basically, quantum cryptography relies on the use of individual particles and waves of light (photons) and their intrinsic quantum properties to develop what is essentially an unbreakable encryption scheme—because it is impossible to measure the quantum state of any system without disturbing that system. It is theoretically possible that other particles could be used, but photons have been found to work very well for transmitting encryption key data. Moreover, photon behavior is relatively well-understood, and they are the information carriers in optical fiber cables, one of the most promising medium for extremely high-bandwidth data communications.

Each of the above-described techniques for supplying keys and key material to cryptos, including the quantum cryptography key distribution method, takes some time to employ. Thus, it is possible that the new key material will not be delivered in time, i.e., before too much time has passed using the old key, or before too many bytes of data traffic have been encrypted via the old key. While the link may continue to operate—it may be considered "insecure" or "degraded" because the data traffic can no longer be encrypted or because a particular key has been used longer than desired and therefore may no longer be trusted as secret. Alternatively, such links may be abruptly removed from service until new keys are supplied and made operational, thereby adding a measure of congestion and/or denied access to the data communications network.

Under these circumstances, it is frequently useful, if not absolutely necessary, to take advantage of the fact that some of the data or data packets queuing up to traverse a given network interface link are more important and/or more confidential than other data or data packets queuing up to use the same link. This situation might arise, for example, when the owner of the data traffic being transmitted has paid a premium to ensure that his or her data is handled with a higher priority, a higher degree of security, a faster delivery time, or some combination of all of the above. The negative consequences of trying to transmit higher-priority and highly-sensitive data traffic across unsecure, congested or inaccessible links may pose too great a risk in some data communications contexts. In a military context, for example, whether certain data transmissions reach their intended destination on time, with absolute secrecy and with unquestionable integrity could mean the difference between life and death. In these situations, it can be extremely beneficial, if not critical, to apply some method of "flow control" to the interface link.

"Flow control" is the management of data flow between computers or devices or between nodes in a data communications network so that the data is transmitted at an optimum rate and in a preferred order. Too much data arriving before a device or interface link can handle it can cause a queue overflow condition, meaning that some of the data is either lost or must be retransmitted. In a data communications network, flow control for a network interface link is usually implemented by changing the order of, slowing down or ceasing data transmissions across the network interface until any congestion in the interface eases. A related technique is often called "queue management." Both techniques aim to differentially manage how a number of different data flows are scheduled onto a network interface for transmission.

A common way of implementing flow control for data communications is to use one of a variety of related methods collectively referred to as "Fair Queuing" or "Weighted Fair Queuing." In this technique, different traffic flows are assigned their "fair share" of a network link, and a queue management algorithm is applied in order to select which data packet should next be transmitted, with the goal of giving each of the defined traffic flows their proportionate share of the link capacity. Another technique is sometimes called "Priority Queuing." In this technique, the various traffic flows are assigned relative priorities, and all packets of a higher priority are sent before any packet of a lower priority can be sent.

Another method of flow control commonly used in data communications networks is called "Random Early Drop" or "Random Early Detection" (RED), which improves performance in networks using the Transmission Control Protocol/Internet Protocol (TCP/IP) suite, which is the main communications protocol used on the Internet. While IP takes care of handling the actual delivery of the data packets, TCP takes care of keeping track of the individual data packets for reliable delivery through the network. When all the packets in a transmission do not reach their destination (indicating that one or more intermediate links is unavailable or congested), TCP automatically decreases its data transmission rate. When all the packets in a data transmission reach their destination (indicating that the link has become available and/or not congested), TCP automatically increases its transmission rate. By randomly dropping data packets prior to or during periods of high congestion, and not dropping packets during periods of no or low congestion, RED takes advantage of TCP's automatic congestion control mechanism.

"Weighted RED" (WRED) flow control, which is a derivative of RED, generally drops packets selectively based on the values of certain fields contained in the packets, such as the Internet Protocol (IP) precedence field, the source and destination address fields, the protocol field, or any other fields capable of distinguishing different data flows. In the case of IP precedence, packets with a higher IP precedence are less likely to be dropped than packets with a lower IP precedence. Thus, higher priority traffic has a higher probability of being delivered to its destination than lower priority traffic. Although WRED is a very useful flow control technique to use on any network interface where congestion may be expected, it is usually used in the core (interior) network routing devices. Edge network routing devices typically assign IP precedence to data packets as they enter the network and the interior network routing devices use those IP precedence assignments to determine how the packets are routed.

Notably, networks using WRED may be configured to ignore IP precedence when making data packet drop decisions, so that non-weighted RED behavior is achieved. Many other forms of flow control are also in use today.

Among other shortcomings, conventional flow control systems for data communications networks (including those described above) do not take remaining encryption capacity into account when making flow control (e.g., data pocket dropping) decisions. In other words, the links between nodes in an encrypted network are usually assumed to be encrypted, and all of the flow control decisions are based on link metrics having nothing to do with the remaining encryption capacity of the links. Consequently, data packets are ordered (usually on a first-in-first-out basis), queued and transmitted across interface links without regard to the fact that the link may soon become unsecure or taken out of service altogether because its encryption material is exhausted.

Accordingly, there is a need for systems and methods of controlling the flow of data traffic in cryptographically-protected networks where the remaining encryption capacity of links contained in the network is used to establish the optimal rate and order of data flows. The determination of the optimal rate and order of data flows may be based on a variety of data characteristics, such as the importance and/or sensitivity level of the data, source/destination address pairs, protocol fields, etc. There is a further need for such systems and methods to include routing programs and devices that generate, report and analyze remaining encryption capacity data and distribute the results to other routing programs and devices in the data communications network. The other routing programs and devices may then use the remaining encryption capacity data to help determine the optimal rate and order of data flows to other parts of the network.

SUMMARY OF INVENTION

In general, the present invention operates as follows. When the remaining encryption capacity of a link is "running low," the invention probabilistically discards data, comprising one or more data packets, that are intended for transmission across the link based on a specified or calculated classification level of the data packets. The lower the classification level and remaining encryption capacity, the higher the probability of discard. As a result, data and data packets with lower classification levels are randomly discarded from links with low remaining encryption capacity before the encryption capacity is exhausted. The closer a link comes to being removed from service or considered unsecure, the higher the percentage of data or data packets that will be discarded. Some traffic flows may be exempted from discards altogether, e.g., traffic that has been deemed to be of very high importance.

This technique has two inter-related effects. First, as stated above, discarded data or data packets are often treated, in the TCP/IP protocol suite, as an indication of congestion. The host computers sending these packets notice that some of the packets are not getting through, and throttle back on the rate at which they send data packets across the link. Second, this cut-back in turn reduces the amount of data traffic that is flowing along a particular path in the network, and hence extends the amount of time for which the remaining encryption capacity for that path can be used. This slow-down may provide enough time for new keying material to arrive at the crypto. Once the new keying material arrives, the remaining encryption capacity increases, the host computers increase their transmission rates, and the link can start moving a full load of data at full speed again.

In addition to discarding data packets, the queue management schedule may be configured so as to favor certain traffic flows over others based on remaining encryption capacity. This favoritism may be abrupt—e.g. all traffic of a certain class may simply be discarded when the remaining encryption capacity runs low. Alternatively it may be gradual—e.g. packets from certain traffic flows become discarded with increasingly high probability as the remaining encryption capacity decreases.

In short, the present invention provides a way to "slow down," and/or reprioritize data transmissions on a congested encrypted link so that its remaining encryption capacity (or remaining key material) can be stretched out as long as possible, and/or dedicated to certain traffic classes at the expense of others, rather than allowing such transmissions to continue at full speed until the link is abruptly removed from service when its key material expires. Since overall network traffic throughput generally responds better to slowly changing conditions rather than to abrupt transitions, one result of applying the present invention is better overall network throughput and reliability. The invention also determines and implements an optimal ordering of data packets, taking remaining encryption capacity into account.

Accordingly, the present invention comprises a method for controlling the flow of a stream of data across a network interface. The method comprises the steps of: (1) storing a key material in a key storage area; (2) providing a cryptographic engine configured to use at least a portion of the key material to encrypt a data packet from the stream; (3) generating a report comprising an indicator of a remaining encryption capacity; and (4) for each data packet in the stream, (a) determining a traffic class for the data packet, (b) computing a probability of discard (Pd) for the data packet based on the report and the traffic class, (c) discarding the data packet if the probability of discard (Pd) is greater than or equal to a random number, and (d) queuing the data packet for transmission across the network interface if the probability of discard (Pd) is less than the random number.

In some embodiments of the invention, the indicator may be based on one of several factors, including, for example, the amount of key material in the key storage area, data representing an amount of time elapsed since a prior report was generated, data representing the amount of time elapsed since the key material was replenished, data representing a quantity of data packets encrypted by the cryptographic subsystem since a prior report was generated, a quantity of additional data packets the cryptographic engine can encrypt prior to the key material in the key storage area being exhausted, or a rate at which the key material is being used by the cryptographic engine. The indicator may also be based on a combination of one or more of these factors.

In another aspect of the present invention, the method comprises the steps of: (1) receiving a report comprising an indicator of a remaining encryption capacity for the network interface; and (2), for each data packet in the stream, (a) determining a traffic class for the data packet, (b) computing a probability of discard (Pd) for the data packet based on the remaining encryption capacity and the traffic class, (c) comparing the probability of discard (Pd) to a random number, (d) discarding the data packet if the probability of discard (Pd) is greater than or equal to the random number, and (e) queuing the data packet for transmission across the encrypted network interface if the probability of discard (Pd) is less than the random number.

In another embodiment of the present invention, the method for controlling the flow of a stream of data across an encrypted network interface comprises the steps of (1) receiving a report comprising an indicator of a remaining encryption capacity for the encrypted network interface; (2) determining a traffic class for a data packet in the stream; and (3) assigning the data packet to a transmission queue based on the remaining encryption capacity and the traffic class.

In preferred embodiments, the methods summarized above and described in detail below also include the steps of storing the reports in one or more databases, and using statistical analysis for estimating a remaining encryption capacity based on the report.

The present invention may also be used to provide a new kind of network routing device (such as a router or switch). For example, a network routing device configured in accordance with the present invention comprises: (1) a packet classifier configured to determine the traffic class of a data packet received by the network routing device via an inbound network interface link; and (2) a policing agent, which is coupled to the packet classifier, and configured to determine whether and in what order the data packet will be transmitted over a particular outbound network interface link based on the traffic class and a signal received by the network routing device indicating a remaining encryption capacity for the link. The policing agent is also configured, in a preferred embodiment, to place the data packet in an output queue for transmission. The network routing device may further comprise a scheduler configured to remove the data packet from the output queue and to place it on the outbound network interface link.

In a preferred embodiment, the present invention may be advantageously combined with methods and apparatuses for "routing" data traffic over encrypted links in a cryptographically-protected data communications network, as opposed to just applying flow control. Several such methods and apparatuses are described in a co-pending application entitled, "METHOD AND APPARATUS FOR ROUTING DATA TRAFFIC IN A CRYPTOGRAPHICALLY-PROTECTED NETWORK," application Ser. No. 10/392,492, filed on even date herewith and assigned to the assignee of the present application, the entirety of which is incorporated herein by reference.

Using an analogy to air travel, where a passenger is to travel from Washington, D.C. to a final destination of Los Angeles, Calif., a routing system in accordance with the above-identified co-pending application Ser. No. 10/392,492, is like the airline, which determines whether the passenger will take the plane going through Dallas or the one going through Chicago. A flow control system in accordance with the present invention, however, is like the gate agent and air traffic controller, who determine, not which plane to put the passenger on, but the order and priority in which the passenger will board the plane (relative to all the other passengers boarding the same plane), and the timing and speed with which the plane will leave the gate and take off. The order in which the passenger boards the plane may depend on any number of relevant factors, such as whether the passenger has purchased first class, business class or some other priority class of service. However, the timing and speed with which the plane leaves the gate and takes off may depend on other factors, such as the weather or congestion on the runways or in the anticipated flight path.

FEATURES AND ADVANTAGES OF THE PRESENT INVENTION

It is a feature of the present invention that it includes an information channel configured to provide reports indicating a remaining encryption capacity for one or more network interface links.

It is another feature of the present invention that it provides a mechanism for making flow control decisions (ordering and/or dropping data packets) based on the remaining encryption capacity of interface links in the data communications network.

It is yet another feature of the present invention that it can be further configured, using optional database and statistical analysis tools, to calculate, use and distribute estimates of future remaining encryption capacity so that other devices in the network may also order and/or drop data packets based on these estimates.

The present invention has significant advantages over conventional systems. First, it provides a way to slow down, discard, and/or re-order the transmission of data packets across links where keying material is about to become exhausted, thereby avoiding situations where critical and/or confidential data traffic is compromised or delayed by links that have become unsecure or have been removed from service altogether. Second, it can be configured to "load balance" traffic across encrypted links so that cryptos in the network run down at roughly the same rate. Such load balancing helps create a more stable and reliable data transmission environment. Third, it can be combined with a routing scheme to facilitate steering different types of traffic across different encrypted links, depending on a priority or sensitivity value associated with the type of traffic being transmitted. Thus, very important traffic may be transmitted first or via a path that may have a relatively large remaining encryption capacity, while less important traffic is transmitted last or via a path that has relatively little remaining encryption capacity.

DETAILED DESCRIPTION OF THE PREFERRED EMBODIMENTS

With reference now to the figures, a detailed discussion of embodiments of the present invention is presented. Notably, the present invention may be implemented using software, hardware or any combination thereof, as would be apparent to those of skill in the art. The figures and examples below are not meant to limit the scope of the present invention or its embodiments or equivalents. For purposes of this specification, as well as the claims that follow, the term "network routing device" means a router, a switch, or a computer or computer program configured to perform the functions of a router or switch, and/or any other piece of networking equipment or apparatus having all or part of the functionality typically found in a network router or switch.

Figure 1A:
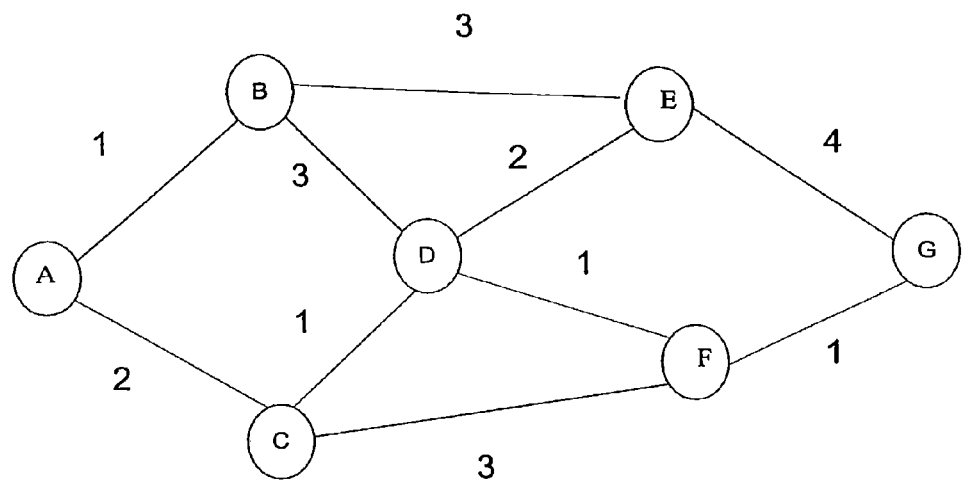
FIGS. 1A and 1B contain graphical representations of a data communications network, wherein numerical values associated with each interface link indicate the link metrics for that link.

FIG. 1A shows a classic "weighted graph" diagram for a conventional data communications network. The diagram includes "simplex" link metric references, which means a single numeric value, or weight, is associated with each link to represent a quantitative or qualitative aspect of the link regardless of the direction in which data flows along that link. In situations where an important functional, quantitative or qualitative aspect of each link differs, depending on the direction in which data traffic flows along the link, "duplex" link metric references (not shown) may be used, i.e., assigning two weights to each link (one for each direction of data traffic flow).

Figure 1B:
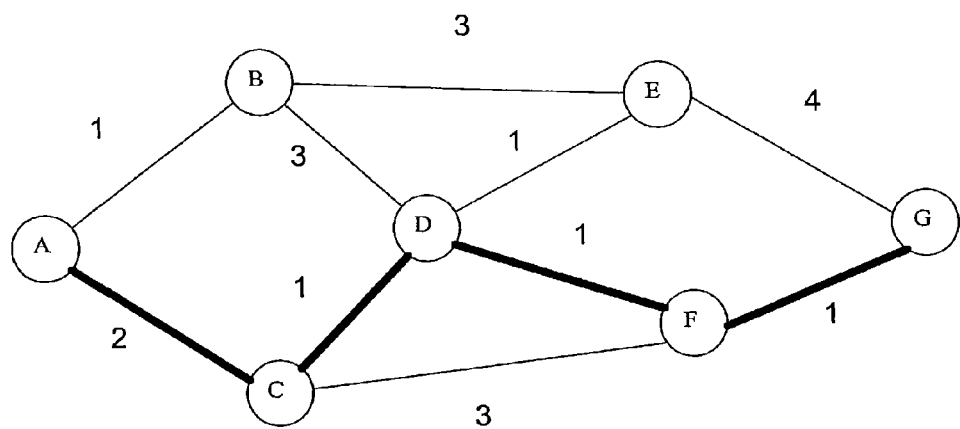

As FIG. 1A illustrates, data traffic traveling from Node A to Node G may get there by traveling along a variety of different paths, such as the path described by route A-B-E-G, or route A-C-F-G, or route A-B-D-F-G, and so on. The best, most efficient, or most secure route, however, may be determined by a calculation based, at least in part, on the link metrics (weights) assigned to each of the links between the nodes in the set of potential routes. FIG. 1B, for example, shows the best route for a datagram traveling from Node A to Node G based on a "shortest path" calculation, i.e., the path whose arithmetical total of link metrics (weights) is least. In this example, the route A-C-D-F-G (distinguished in FIG. 1B with bolded lines between the nodes) describes the "best" path, because it is the path with the least arithmetic sum of its link metrics. In some situations, it may be advantageous to define "best" in some other way, e.g., greatest arithmetic sum, or the path with the maximal value of the worst (minimal) link metric along that path, etc.

Figure 2:
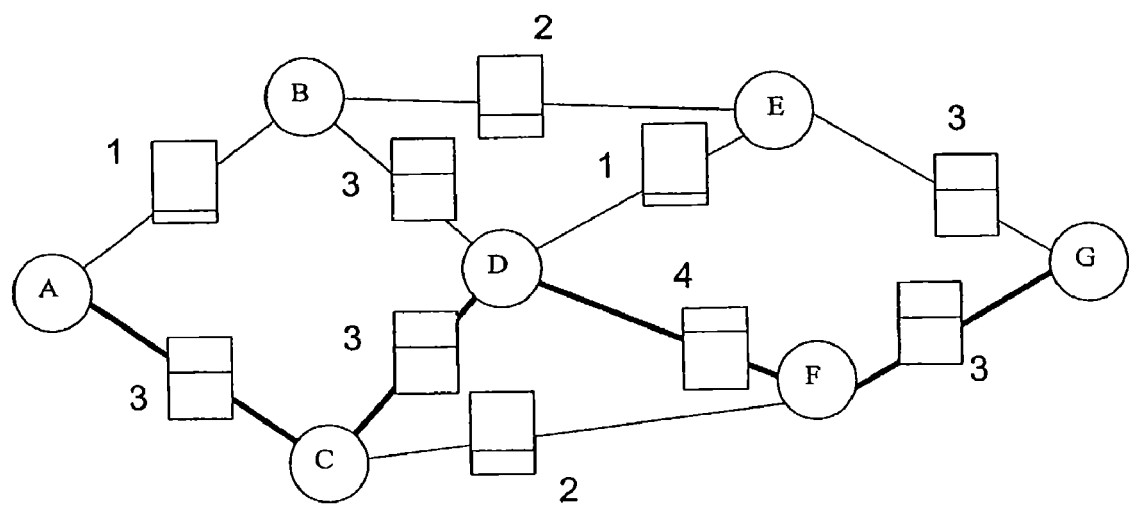
FIG. 2 contains a graphical representation of a data communications network, wherein the link metric associated with each link comprises a numerical value representing the amount of keying material contained in a key reservoir or key storage area.

FIG. 2 contains a block diagram of a data communications network configured to operate in accordance with the present invention. Each rectangle in FIG. 2 represents a key material storage area or "key reservoir" associated with each link in the network. The number beside each key reservoir typically indicates how many bits of keying material are available for use along that link. These bits typically get "burned up" at some rate as data traffic passes along that link. For the simple case illustrated by FIG. 2, for example, in which the same key material is used regardless of the direction the data travels, the key reservoir is shown directly atop the link. One skilled in the art, however, would recognize and appreciate that in a network configured in accordance with the present invention, separate key reservoirs for each direction of data travel may be located at both or either end of the links, at locations remote from the links, such as on host computers coupled to the network, or elsewhere in the network.

The data stored in a key storage area or reservoir may be of two different types. First, it may consist of actual bits of keying material—e.g. 2,000 bits of keying material—that has yet to be inserted into a cryptographic engine (the cryptographic engines are not shown in FIG. 2). In most cases, however, key material is not used up on a bit-for-bit basis with transmitted data traffic. That is, a key that is 1,000 bits long might be used to encrypt (say) 100 megabytes of data traffic, assuming that the key has been supplied as input to a high-enough quality cryptographic algorithm. Thus, even if the reservoir is empty (i.e., there are zero bits of keying material in the reservoir waiting to be used by the cryptographic engine), the system may still have a non-zero measure for the amount of data traffic that can still be safely encrypted with the keying material already in the cryptographic engine.

Accordingly, the number of bits of keying material is not the only type of data that can be stored in the key storage area or reservoir. In some embodiments, it may be beneficial to store a second type of data, namely: (1) a current snapshot of how many more bytes of data traffic may be encrypted with the remaining key material in the crypto subsystem (which is the sum of the number of bytes already in the crypto engine plus the number of bytes in the reservoir); or (2) that same snapshot augmented by a current indication of the rate at which the key material is being used up (i.e., the key material "burn rate"). The burn rate may be measured in any convenient unit, such as bits/second.

In some cases, the burn rate for the key material may be more important than the number of bytes of key material. For instance, if a link has a remaining encryption capacity of 100 Megabytes but is currently passing 100 megabytes/second of data traffic, its reservoir will be exhausted in 1 second. A different link running at 10 megabytes with the same remaining encryption capacity will be exhausted in 10 seconds. Measured in bytes of data traffic they can encrypt, both links have equivalent remaining encryption capacity. However, if some data traffic in the network has been granted a higher priority (perhaps because it is more urgent and/or more sensitive), it may be wise to route such traffic over the 10 megabyte link because that link is less likely to be removed from service in the next second.

In a data communications network like the one depicted in FIG. 2, certain links may be very close to running out of keying material (the link between nodes D and F, for example), while others may have key material to spare (e.g., the link between F and G). The present invention provides a way of slowing down the transmission of data packets across a link based on the remaining encryption capacity for the link. The present invention also provides a technique for ordering (queuing) a stream of data traffic on an encrypted link in such a way that data having a higher level of priority or sensitivity has a higher probability of being successfully transmitted across the interface link before the link runs short of keying material. This is accomplished by selecting the next data packets to be transmitted based on remaining encryption capacity.

Figure 3:
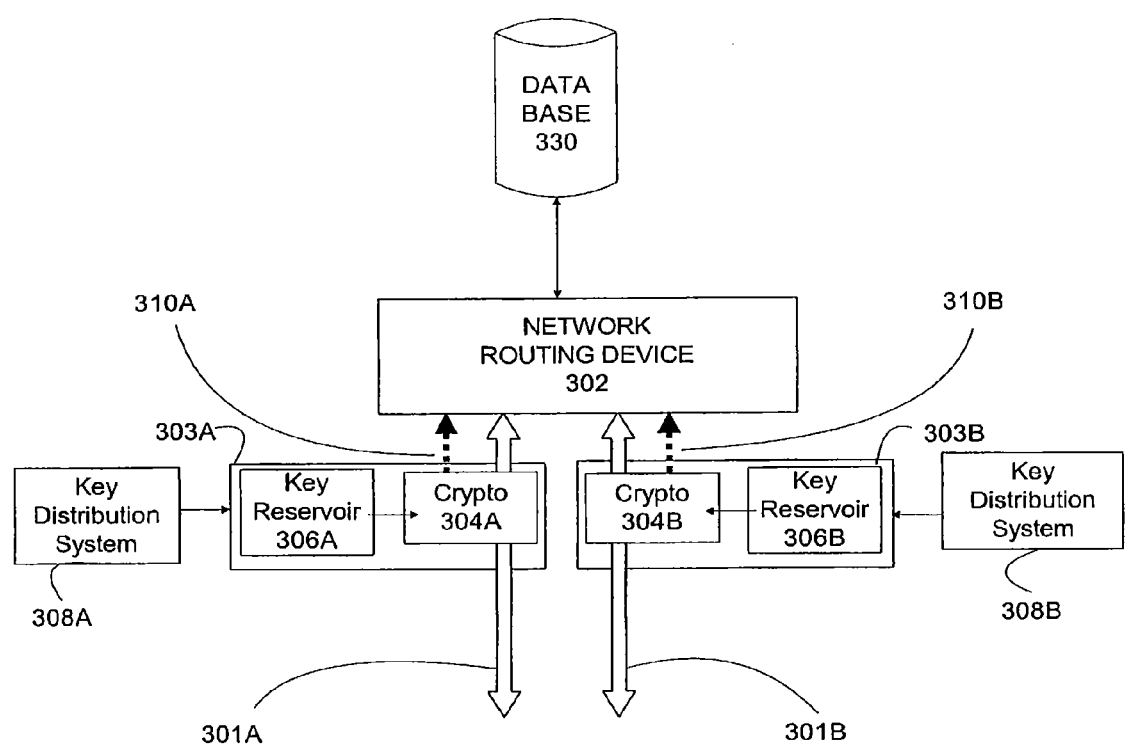
FIG. 3 depicts a high-level block diagram of a system for controlling the flow of data traffic in a cryptographically-protected network in accordance with one embodiment of the present invention.

FIG. 3 contains a high-level block diagram illustrating one arrangement of components that could be used to implement flow control in an embodiment of the present invention. The embodiment comprises a Network Routing Device 302, coupled to a Database 330, and two Network Interface Links 301A and 301B, which are protected by Cryptographic Subsystems (or "cryptos") 303A and 303B. It will be understood by one of skill in the art that the network routing device could be connected to more or fewer interface links without departing from the scope of the invention. Moreover, it is not necessary that all links connected to the network routing device be cryptographically protected in order to achieve some of the benefits of using the present invention. It may also be possible and/or advantageous, depending on the nature of the network, the interface links and the data traffic, to use a single cryptographic subsystem to provide protection for multiple interface links, or multiple cryptographic subsystems to protect a single interface link. Such alternative arrangements are also within the scope of the present invention.

The Cryptographic Subsystems 303A and 303B depicted in FIG. 3 comprise Cryptographic Engines 304A and 304B, which are configured to use key material to encrypt data traffic before transmitting the encrypted data traffic over Network Interface Links 301A and 301B. Cryptographic Subsystems 303A and 303B also comprise key storage areas or "key reservoirs" (depicted in FIG. 3 as 306A and 306B), where the key material is stored until it is ready to be used by Cryptographic Engines 304A and 304B. For purposes of the present invention, almost any form of digital or analog memory storage space or data depository area may be suitably adapted for use as a key reservoir. Such memory areas may comprise, for example, a computer's random access memory (RAM), a hard disk, a floppy disk, a compact or flash memory card, a CD-ROM, or tape backup system.

In a preferred embodiment, and as shown in FIG. 3, Cryptographic Subsystems 303A and 303B are coupled to Network Routing Device 302 via Key Storage Information Channels 310A and 310B, which are used by Cryptographic Subsystems 303A and 303B to convey to the Network Routing Device 302 information about their remaining encryption capacity. Such information may include, for example, how much keying material remains in Key Reservoirs 306A and 306B or how many more bytes of data traffic Cryptographic Subsystems 303A and 303B can encrypt before their current supply of keying material is exhausted and must be replenished.

FIG. 3 also depicts optional external Key Distribution Systems 308A and 308B, coupled to the cryptographic subsystems 303A and 303B, which supply Key Reservoirs 306A and 306B with additional keying material. Examples of such key distribution systems are discussed below with reference to FIGS. 10A and 10B.

Figure 4:
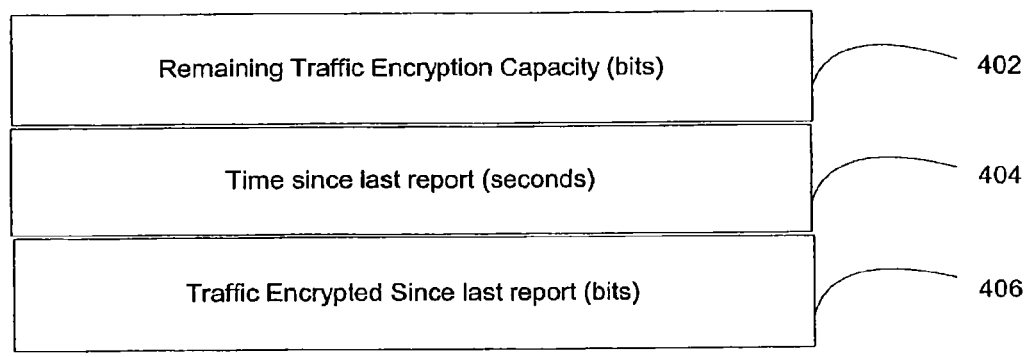
FIG. 4 depicts an exemplary format for a report, generated by a cryptographic subsystem in one embodiment of the present invention, wherein the report contains an indicator of a remaining encryption capacity.

Cryptographic Subsystems 303A and 303B may be configured to generate remaining encryption capacity reports and deliver the reports to network routing device 302 at periodic intervals, whenever requested, or when some event occurs in the network. FIG. 4 shows an example of the contents of such a report. In this example, the report includes fields for the remaining encryption capacity 402, the time elapsed since the last report was sent 404, and the amount of traffic encrypted since the last report was sent 406.

Returning now to FIG. 3, in a preferred embodiment, the remaining encryption capacity for a given link is stored in a database (depicted as 330 in FIG. 3) configured, for example, to keep track of the remaining encryption capacity for all links in the data communications network. Database 330 may be updated at certain predefined time intervals or each time Network Routing Device 302 receives a new report from other routing devices in the network or from Cryptographic Subsystems 303A and 303B. Thus, each network routing device can keep a table of the most up-to-date information for each of its encrypted links. In the embodiment depicted in FIG. 3, Database 330 is coupled to network routing device 302. However, Database 330 could be coupled to some other device or component in the network and serve the same function.

In a preferred embodiment, Network Routing Device 302 may be configured to share the remaining encryption capacity reports (or boiled-down information based on these reports) with other devices in the network, via a routing protocol, so that some or all of the other network routing devices in the network may ascertain the remaining encryption capacity or security status for any link in the network. One convenient means of accomplishing this is to use the Open Shortest Path First (OSPF) protocol, as described above with reference to FIG. 1B. Other routing protocols, such as Constraint-based Routing Label Distribution Protocol (CR-LDP), Intermediate System to Intermediate System (IS-IS) protocol, Multiprotocol Label Switching (MPLS), Asynchronous Transfer Mode (ATM), Resource Reservation Protocol (RSVP), Border Gateway Protocol (BGP), Simple Network Management Protocol (SNMP), Synchronous Optical Network (SONET) protocol, Internet Control Message Protocol (ICMP) and Routing Information Protocol (RIP), would work equally well. Indeed, remaining encryption capacity information can be distributed by essentially any kind of conventional routing protocol, once it has been extended to convey this new information. These reports may also be shared by using shared memory areas or registers, or by any other convenient means.

RIP (Routing Information Protocol) is a widely-used protocol for managing router information within a self-contained network such as a corporate local area network or an interconnected group of such LANs. Using RIP, a gateway host (with a network routing device, such as a router or switch) sends its entire routing table (which lists all the other hosts it knows about) to its closest neighbor host every 30 seconds. The neighbor host in turn will pass the information on to its next neighbor and so on until all hosts within the network have the same knowledge of routing paths, a state known as "network convergence." RIP uses a "hop" count (a "hop" being the trip a data packet takes from one router or intermediate point to another in the network) as an indication of network distance. (Other protocols use more sophisticated algorithms that include timing as well.) Each host in the network with a network routing device uses the routing table information to determine the next host to route a packet to for a specified destination.

In an embodiment of the present invention, the RIP protocol can be extended such that the routing table also contains information about the remaining encryption capacity for each link. Then each host or network routing device in the network can use the remaining encryption capacity entries in the routing table to make flow control decisions, such as whether and in what order data packets should be queued or dropped. It is in this sense that the remaining encryption capacity becomes a new form of link metric. This new form of link metric can be used as the only metric for a given network link for purposes of performing flow control, or it can be combined with other link metrics associated with the data communications network (such as link stability, link capacity or link delay) in order to make and carry out more complex flow control decisions for data traffic.

In one embodiment, the flow control functionality of the present invention may be implemented in the network routing device. Basically, the network routing device uses the remaining capacity information (or estimates thereof) supplied by a link's cryptographic subsystem (e.g., 303A or 303B of FIG. 3) to determine whether it should discard (or not discard) packets destined for that link. Unlike the present invention, conventional flow control systems typically base such discard determinations only on queue lengths rather than estimates of remaining encryption capacity, thereby failing to account for the fact that some links may soon become unsecure or inaccessible because the link has exhausted its encryption key material. But in a system configured according to the present invention, a low remaining encryption capacity causes packets to be discarded or re-ordered depending on certain characteristics of the packets, such as priority, sensitivity or security level. When packets are discarded, the TCP/IP protocol suite automatically begins throttling back on data transmissions through that link.

Figure 5:
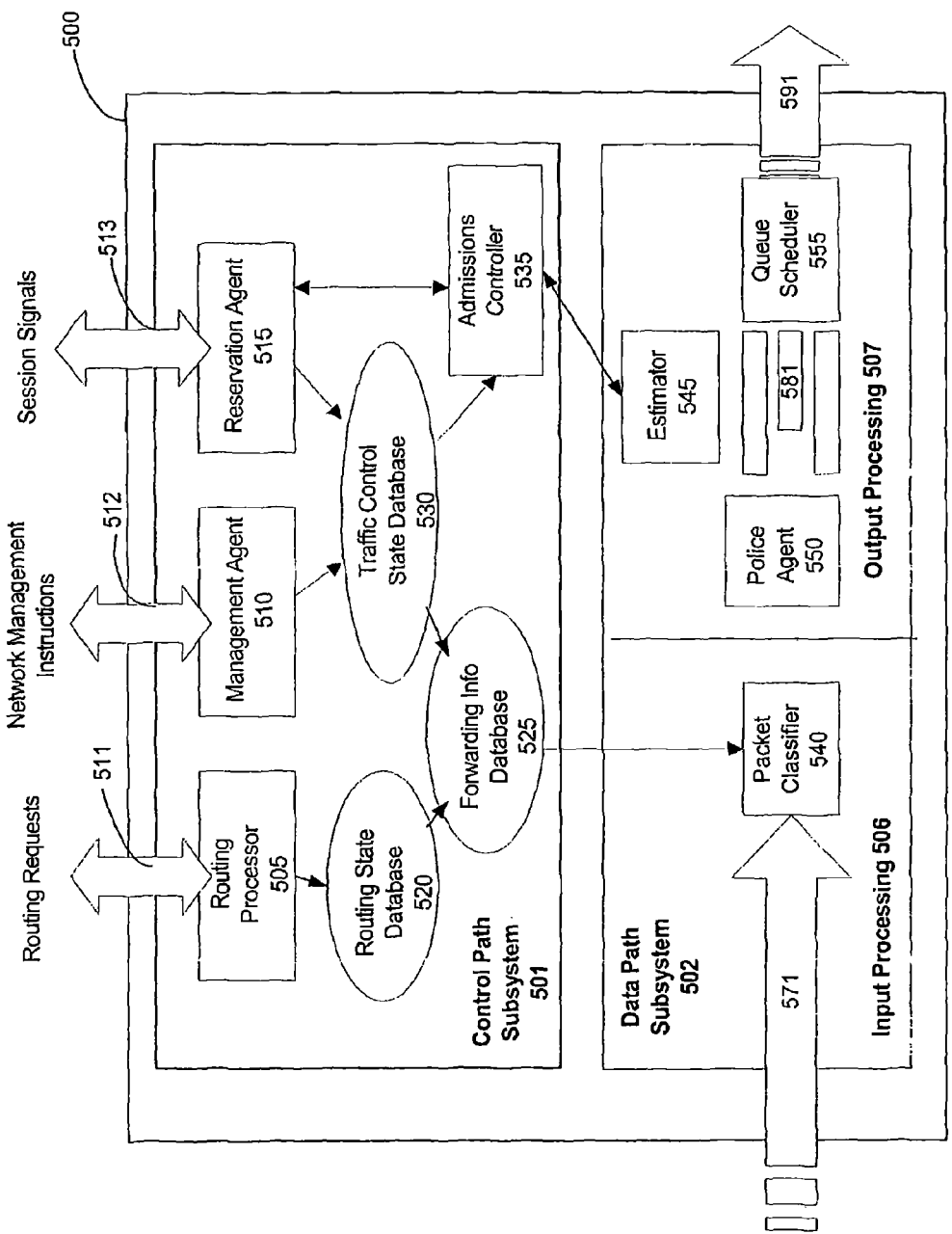
FIG. 5, which depicts a high-level block diagram of a network routing device configured in accordance with one embodiment of the present invention, illustrates the relationships between the functional components of such a device.

FIG. 5 depicts a high-level block diagram of a network routing device configured to operate in accordance with the present invention. From a functional perspective, and as illustrated by Network Routing Device 500 in FIG. 5, most network routing devices (e.g., routers and switches) are comprised of two major subsystems, namely, Control Path Subsystem 501 and the Data Path Subsystem 502. Figuratively speaking, the Control Path Subsystem 501 serves as the "brains" of the device and the Data Path Subsystem 502 serves as the "brawn." That is to say, all traffic control processing, which includes routing protocols, network management, circuit setup and teardown, etc., occurs in the Control Path Subsystem 501, while the data traffic processing (the actual process of forwarding data packets to their next destination) occurs in the Data Path Subsystem 502. In general, one or more general-purpose processors manage the Control Path Subsystem 501, while specialized hardware devices, usually in conjunction with highly customized, real time software, manage the Data Path Subsystem 502. The two major subsystems typically communicate with each other via shared memory areas, a shared data bus, a network or communications link, and/or specialized data registers (not shown in FIG. 5) residing in the network routing device.

Control Path Subsystem 501 of a Network Routing Device 500 comprises a Routing Processor 505, a Management Agent 510, a Reservation Agent 515, a Routing State Database 520, a Traffic Control State Database 530, a Forwarding Info Database 525 and an Admissions Controller 535. Control Path Subsystem 501 typically receives routing requests, network management instructions and session signals through input connections 511, 512 and 513, respectively. A detailed description of the functions typically handled by each of these individual components in a preferred embodiment of the invention follows below.

A quality of service enabled ("QOS-enabled") network is a network in which data is transmitted or processed according to multiple and possibly very diverse levels of priority. The priority level may be based on a variety of factors, such as the commercial value of the data, the price paid by the owner of the data to move the data across the network, the sensitivity of the data, etc. Finding paths (routes) through a QOS-enabled data communications network, and establishing the most cost-efficient order and transmission rates for data packets, so that a given data packet can proceed, hop by hop, from its source to its destination in accordance with specified security and precedence rules, can be a complicated task because a large number of pending QOS-specific transmission requests may need to be taken into account before any routing or flow control decision is made. In the present invention, Control Path Subsystem 501 is responsible for finding the best routes and Data Path Subsystem 502 is responsible for determining the order and transmission rate for data traffic.

For example, using ATM or RSVP, Routing Processor 505 in Control Path Subsystem 501 may receive, via input connection 511, a request for a transmission path that takes no more than a specified period of time from source to destination and that can accommodate a certain volume of traffic without undue discards. Such a request is commonly referred to as "making a reservation." The number of paths in the network qualified to satisfy this reservation varies with time as different traffic flows are imposed on and then removed from the network. Thus, what was a good path a few moments ago may no longer be a good path, if, for example, some other traffic flow has now made a large reservation across an important link in the path.

In a preferred embodiment, Routing Processor 505, which may be implemented, for example, by means of a computer software program, a microprocessor, or a combination of both, can be configured to determine the "best" path based on remaining encryption capacity information. The best path may be selected, for example, by performing arithmetic calculations based on the remaining encryption capacity for each potential link in a proposed transmission path (as described above with reference to FIGS. 1A, 1B and 2).

Routing State Database 520 is an extension of the classic routing table with sufficient network metrics (e.g., bandwidth currently reserved or unreserved on a distant link) so that QOS-aware paths can be set up through the network. In a preferred embodiment, Routing State Database 520 has been extended to include information about the remaining encryption capacity of links in the network Management Agent 510 accepts network management instructions from the network via input connection 512 and sends status information back. In QOS networks, Management Agent 510 would preferably be configured to accept new policies that govern who can and cannot make reservations, how admissions control (described below) should be performed, how packets should be classified (also described below), and so forth. In general, network management instructions received and processed by Management Agent 510 represent manifestations of policy-level network management decisions that, in practice, occur only on rare occasions relative to the more frequent and highly dynamic routing requests received and processed by Routing Processor 505 via input connection 511.

Management Agent 510 may pass network instructions to a database manager for incorporation into Traffic Control State Database 530. Traffic Control State Database 530 keeps track of all current reservation policies and the session reservations that are currently in effect. For an ATM-enabled device, which relies on the concept of creating temporary virtual circuits, this database contains such information as those virtual circuit identifiers that are currently in use, the various types of circuits that are currently operational through this switch, and so forth. RSVP contains a somewhat similar collection of information; though with more elaboration for features such as flow aggregation, multicast, and receivers with disparate reservations.

Reservation Agent 515 accepts session signaling commands from other nodes in the data communications network and, responsive to the signaling commands, sets up or tears down the necessary internal router states. In an ATM-enabled network routing device, for example, Reservation Agent 515 handles switched virtual circuit (SVC) signals. A switched virtual circuit (SVC) is a temporary virtual circuit that is established and maintained only for the duration of a data transfer session. The virtual circuit appears to be a discrete, physical circuit available only to the user but it is actually a shared pool of circuit resources used to support multiple users as they require the connections. In an RSVP-enabled network routing device, Reservation Agent 515 sends and receives RSVP control messages. In general, when a session is being set up, Reservation Agent 515 must first check with Admissions Controller 535 (described below) to ensure that there are sufficient network resources (bandwidth, memory for forwarding state, etc.) so that the traffic flow session can be admitted. If not, the requested traffic flow must be rejected.

Admissions Controller 535 is responsible for accepting or denying a request from Reservation Agent 515 to start up a new session with whatever reservation is being requested. It does so by inspecting a set of policies in Traffic Control State Database 530, on the one hand, and estimates of the remaining capacity as determined by Estimator 545 on the other. For example, Routing Processor 505 may be configured, as shown in FIG. 5, to consult Routing State Database 520 to determine the best route capable of handing the routing request.

In a preferred embodiment, Data Path Subsystem 502 comprises, as shown in FIG. 5, Input Processing 506 and Output Processing 507. Input Processing 506 comprises Packet Classifier 540 coupled to Inbound Interface Link 571. Packet Classifier 540 inspects an incoming packet received from Inbound Interface Link 571 and determines which outbound queue it should be placed on. In general, it does this by inspecting some fields within the packet and (for session-based schemes) some additional tables in its memory. As one example, an ATM classifier uses the ATM cell header fields—path and circuit identifiers—as indexes to a table of queues onto which cells should be placed. This table has been built either by network management instructions received through Management Agent 510, or by session signals for SVCs received through Reservation Agent 515. An RSVP-enabled classifier inspects fields in the IP header, such as the source and destination addresses, and uses this information as an index into a roughly equivalent table of queues.

Output Processing 507 is comprised, in a preferred embodiment, of Police Agent 550, Estimator 545, Output Queues 581, and Queue Scheduler 555. Police Agent 550 checks that each flow's offered load stays within the bounds that were determined at session setup time for that flow. If the offered load exceeds that rate, the excess packets may be discarded or shunted to a lower traffic class. Otherwise they are kept at the class established by Packet Classifier 540. In either case, the packet is then placed onto the appropriate queue in Output Queues 581. The exact semantics of policing can vary since the current "offered load" can vary quite a bit, even for a packet flow that is produced at a constant rate, due to "clumping" of packets somewhere upstream in the network. Thus, the current flow may be averaged across a certain period of time so that flows are not unduly penalized when they shouldn't be. In an ATM-enabled device, for example, Police Agent 550 is responsible for measuring the incoming cell rate on a given virtual circuit to ensure that this rate is within the bounds established at circuit setup time. RSVP uses a similar scheme.

Estimator 545 is responsible for observing the actual behavior of the queueing system, as opposed to its theoretical ideal behavior, and informing Admissions Controller 535 accordingly. This function is required in many cases because outgoing traffic cannot be perfectly scheduled and so some fine-grain tuning must be applied via Admissions Controller 535 so that flows are not admitted when in fact they cannot be accommodated.

Queue Scheduler 555 manages Output Queues 581 and determines which queue should next have a packet removed from its head and placed onto Outbound Interface Link 591. In a pure priority scheme, for example, the Queue Scheduler 555 always tries to de-queue the packet from the highest priority queue. If this queue is empty, it tries the next highest; and so forth. In a round robin scheduling scheme, it de-queues a packet from each queue in turn so that every queue has the same priority as all the others. In the widely used Weighted Fair Queuing (WFQ) approach, Queue Scheduler 555 is responsible for giving each queue its fair share of the output bandwidth, where "fair share" has been determined by policy decisions received from Management Agent 510.

Figure 6:
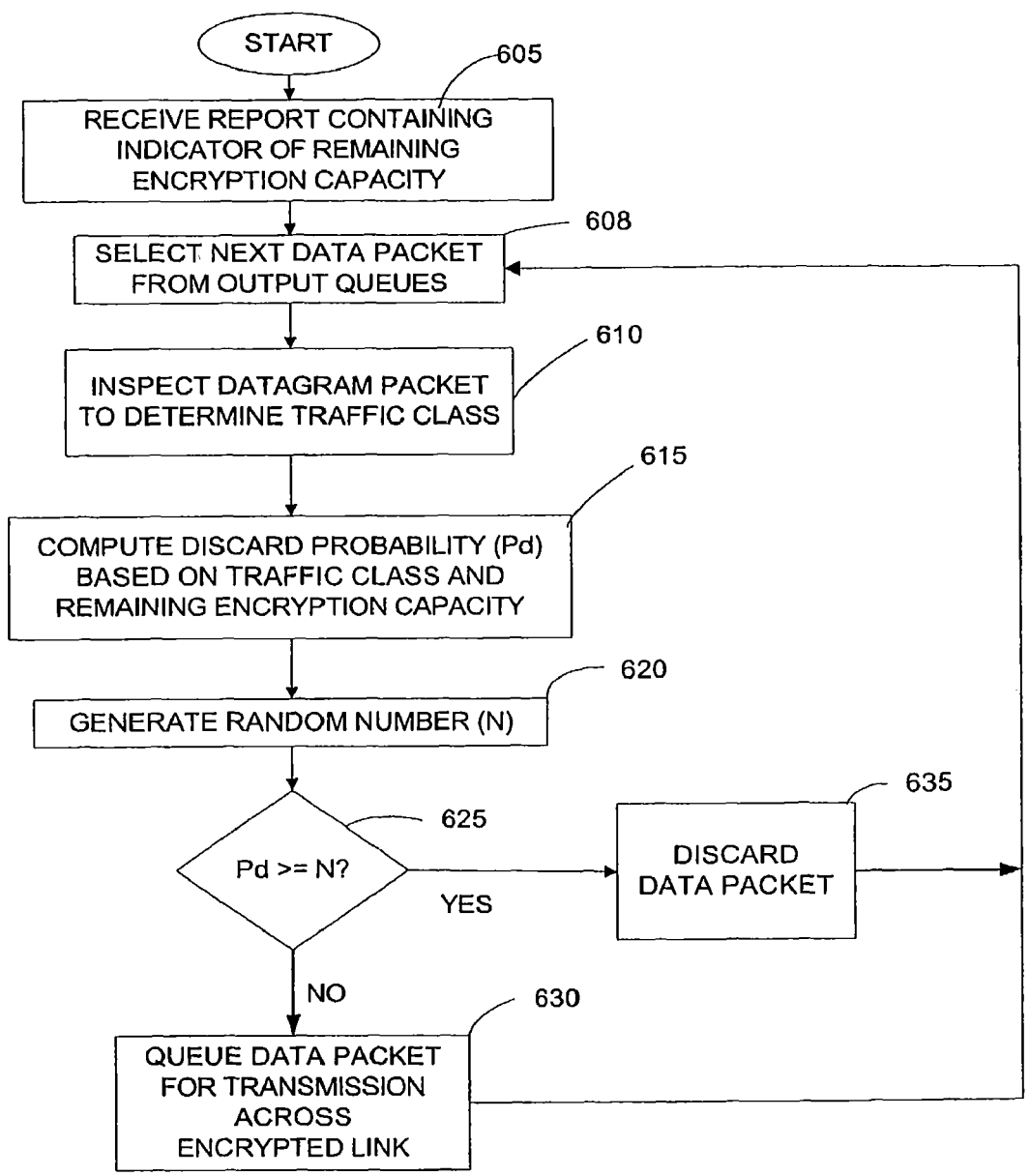
FIG. 6 depicts a flow diagram illustrating the steps performed in an embodiment of the present invention to control the flow of data traffic in an encrypted link.

FIG. 6 illustrates, in flow diagram 600, an algorithm with which a computer processor may be configured, in one embodiment of the present invention, to store data in Output Queues 581, discard packets that exceed the current rate for a given traffic flow, or schedule transmission of data packets from Output Queues 581. The algorithm may be performed by one or more of the components shown in the embodiment depicted in FIG. 5—i.e., Packet Classifier 540, Police Agent 550, or Queue Scheduler 555—or it may be performed by another processing component (not shown in FIG. 5) specifically designed for this purpose. In modern network routing devices, the algorithm most likely would be implemented using hardware such as an application-specific integrated circuit (ASIC) or a field programmable gate array (FPGA) designed for these purposes. Alternatively, a Digital Signal Processor (DSP) or specialized processor could perform these functions. The algorithm might also be implemented by means of a specialized computer software program executing on a general-purpose computer. Notably, the "remaining encryption capacity" used in the algorithm is derived, directly or indirectly, from the "reservoir info" report for the corresponding cryptographic subsystem for this link.

As shown in step 605 of FIG. 6, Police Agent 550 first receives a report containing an indicator of a remaining encryption capacity for cryptographically protected Outbound Interface Link 591. The report may be received at regular time intervals or upon the occurrence of some event elsewhere in the network. Next, in step 608, Police Agent 550 receives the next datagram packet from Packet Classifier 540. Police Agent 550 inspects the datagram packet to determine its traffic class, step 610. In a preferred embodiment, the traffic class of the data packet will have already been established in a prior step (not shown in FIG. 6) performed by Packet Classifier 540 as the data packet entered the Network Routing Device 500 via Inbound Interface Link 571. Similar to the de-queuing process described above with respect to Queue Scheduler 555, Police Agent 550 may be configured to determine which output queue to use for a data packet based on a pure priority scheme, a round-robin scheme or the Weighted Fair Queuing (WFQ) scheme, to name but a few examples.

As stated above, Packet Classifier 540, rather than Police Agent 550, may be responsible for populating Output Queues 581 with classified data packets. In an alternative arrangement, however, Police Agent 550 may be configured to determine the traffic class itself or obtain the appropriate traffic class information from a separate table or database residing elsewhere in the system, rather than receiving such information from Packet Classifier 540.

As shown in step 615, a discard probability (Pd) for the data packet is calculated based on the traffic class and the remaining encryption capacity for Outbound Interface Link 591. The lower the traffic class and remaining encryption capacity, the higher the probability of discard. In a preferred embodiment, the probability of discard (Pd) is normalized so that it equals a number between 0 and 1. In the next step, step 620, the system generates a random number N between 0 and 1, and compares the random number N to the probability of discard (Pd), step 625. If the probability of discard is greater than or equal to the random number N, Police Agent 550 discards the data packet (or causes another process to discard it), step 635, whereupon control passes back to step 608, where the next data packet is received for processing. On the other hand, if, at step 625, it is determined that the probability of discard is not greater than or equal to (i.e, is less than) the random number N, then Police Agent 550 places the data packet into an outbound queue to be transmitted in its turn by Queue Scheduler 555. (Step 630). At this point, control would again return to step 608, where Police Agent 550 receives the next data packet for processing. Although not shown in FIG. 6, Police Agent 550 may optionally be configured to re-check its records (or table) concerning the remaining encryption capacity for the link before processing the next data packet.

Implementation of the steps shown in FIG. 6 would have the effect of causing lower-priority data packets to start being discarded at a rate proportional to the remaining encryption capacity of Outbound Interface Link 591, while allowing the higher-priority data packets to be transmitted with less hindrance or, indeed, with no hindrance at all. When packets are discarded in a TCP/IP-enabled network, TCP automatically causes remote nodes in the network to throttle back on the transmission speeds to this node, which will cause the keying material being used to encrypt the higher-priority data going out over the interface to be used at a slower rate. This provides more time for the keying material for the link to be replenished, which makes it less likely that the link will become unsecure or be removed from service because it has run out of encryption key material.

The Forwarding Information database provides a mapping between a given packet's contents (usually its destination address but sometimes also its source address, protocol, etc.) and an outbound interface. Thus it contains the table that explains where a given packet should go as it proceeds, hop by hop, through the data communications network.

Figure 7:
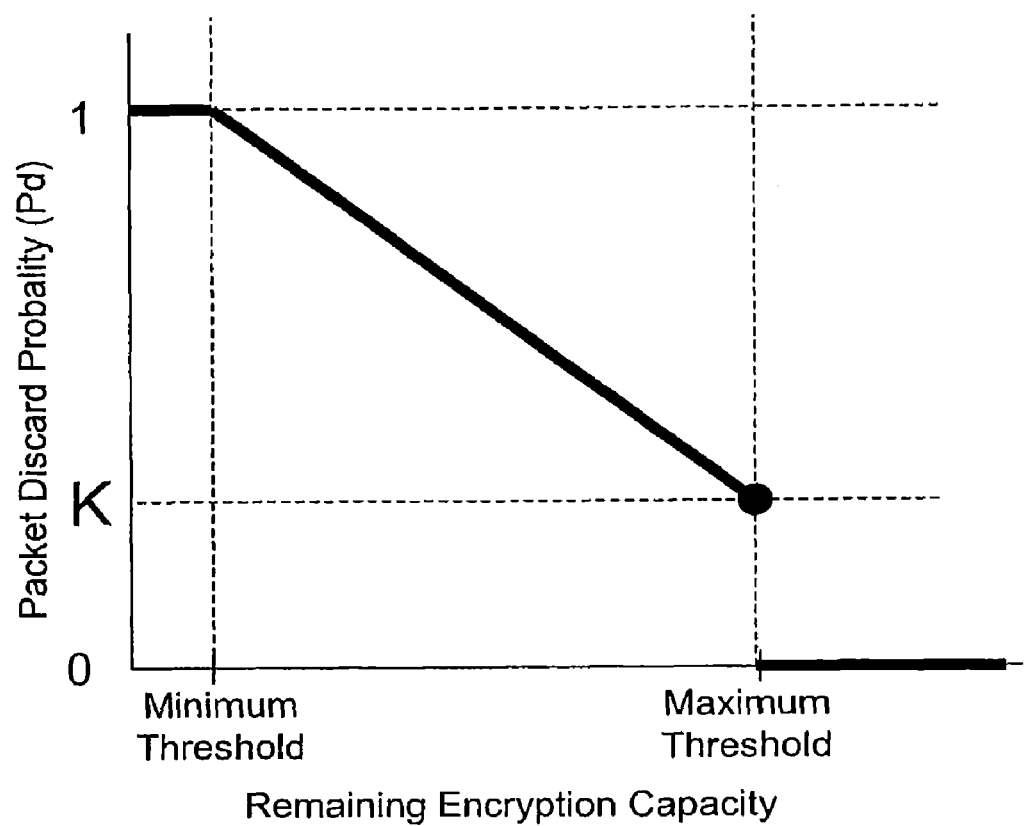
FIG. 7 contains a graph of a function that could be used in an embodiment of the present invention to calculate the probability of discarding a packet of data.

There are many possible ways to compute Pd. One way is through the use of the function shown in FIG. 7. This function discards nothing when the remaining encryption capacity is above a configured high-water mark (maximum threshold). When the reservoir falls below that level, it begins to linearly increase the probability of packet discard until some low-water mark is reached (minimum threshold) at which point it discards all subsequent packets.

A preferred embodiment of the present invention may use a number of such functions, one for each of the traffic classes. Thus for some traffic classes, all packets in a given traffic class may be discarded when there is still remaining encryption capacity. (This case is shown in the upper left portion of FIG. 7, where the remaining encryption capacity is below the minimum threshold) This is because there may be other (more important) traffic classes that should have priority for using that last remaining amount of encryption capability.

The present invention thus allows a network administrator to individually regulate (flow-control) any number of distinct traffic classes, so that the administrator may fine-tune exactly which flows get which resources as encryption resources begin to run dry. These classes can be based on any of the datagram packet contents, including source and destination addresses, protocol, and port numbers, so that very fine-grained control is possible. Indeed, the network administrator can even individually control how flows are throttled for specific people, departments, or computers, so that (for instance) one could devote the last few bits of encryption capacity to a high-ranking official such as a general or admiral transmitting highly-sensitive, high-priority military command data.

Finally, it can be seen that many different Pd functions are possible. Instead of using a linear decay function like the one shown in FIG. 7, one might choose to use a polynomial or exponential decay function, or indeed any arbitrary function that can be either computed or derived from a table.

If desired, the network routing device can also be configured to perform its own statistical analysis of the remaining traffic encryption capacity, rather than simply distributing the newest remaining encryption capacity report. For example, it might be configured to perform a time-series analysis to more accurately estimate the remaining encryption capacity of certain links. Other statistical analysis methods, such as using moving averages, least square estimates, or polynomial or robust estimators, could also be applied as is known in the art to better optimize management of data traffic.

With the present invention, network administrators may also optionally configure the network routing devices to use "high and low-water marks" in order to trigger network-wide flow control decisions. As an example of this embodiment, a network routing device might receive a series of reports from one of its attached cryptographic subsystems but not distribute these reports to the rest of the network via a routing or flow control protocol until it learns that the remaining encryption capacity has fallen below a pre-established or critical "low water" mark. Then the network routing device would share this information, via a network-wide routing table or flow control database update, so all other hosts and network routing devices in the network will know that the remaining encryption capacity is low for a given link and make flow control decisions accordingly. Over time, the key material for the unused link will be replaced or begin to accumulate. When the remaining encryption capacity is replenished and/or accumulates, the network routing device attached to that link may hold off broadcasting this fact to the rest of the network until some "high water" mark is reached, at which point it will issue a new flow control. This use of high and low water marks is generally employed in order to keep transmission rates for traffic in a network at a manageable level, rather than using network bandwidth to repeatedly update the entire network with relatively insignificant changes in remaining encryption capacity for every link.

Figure 8:
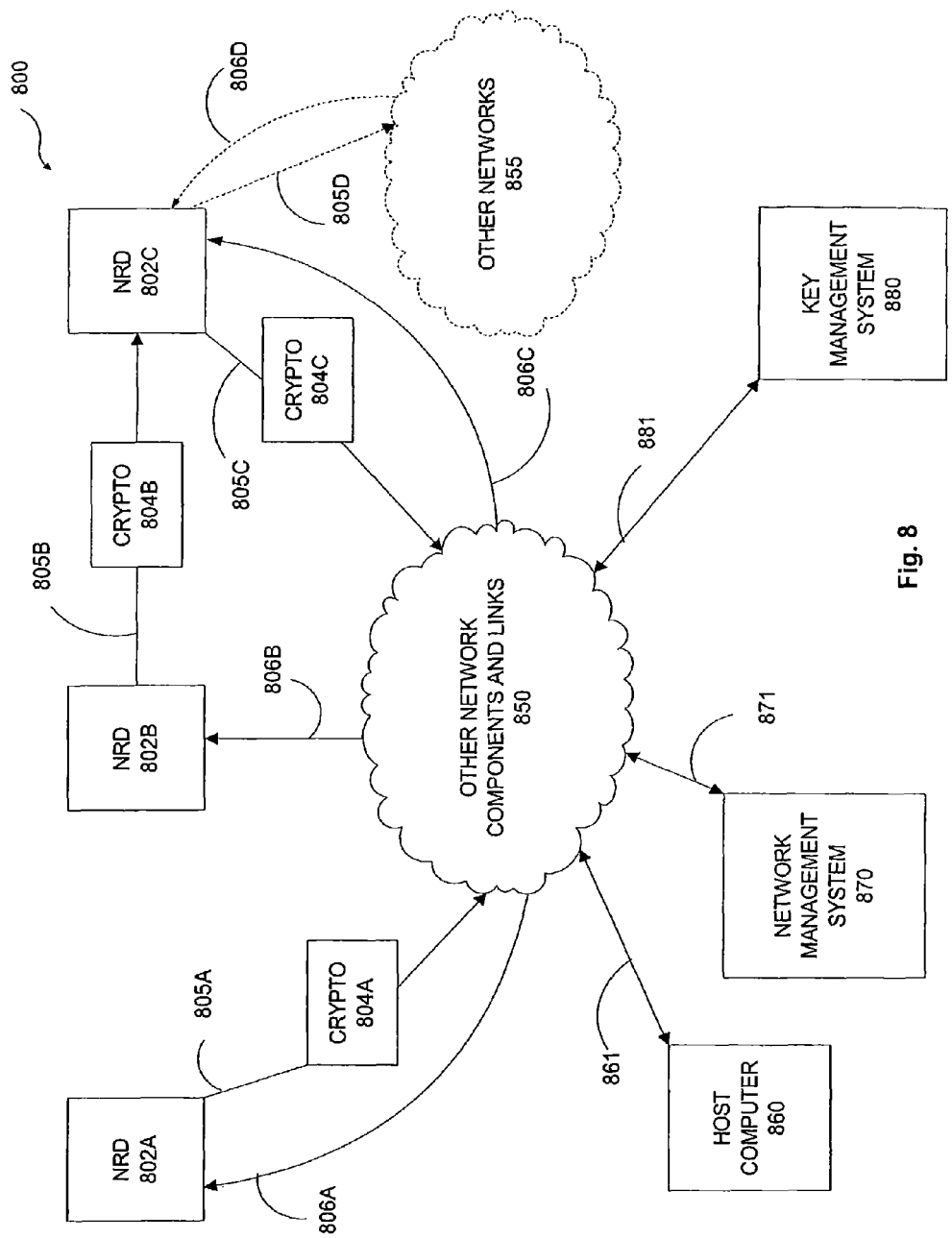
FIG. 8 depicts a high-level block diagram of a data communications network configured to operate in accordance with an embodiment of the present invention, which comprises multiple network routing devices (e.g., routers and/or switches), as well as a host computer, a network management system, a key management system and links to other networks.

FIG. 8 depicts a high-level block diagram 6f a data communications network configured to operate in accordance with an embodiment of the present invention. The Data Communications Network 800 of FIG. 8 contains multiple network routing devices (e.g., routers and/or switches) 802A, 802B and 802C, which are coupled to each other and Other Network Components and Links 850 via outgoing links 805A, 805B and 805C, and incoming links 806A, 806B and 806C. Outgoing Links 805A, 805B and 805C are protected by cryptographic subsystems (designated Cryptos 804A, 804B and 804C in FIG. 8), which periodically send out reports indicating the remaining encryption capacities for Outgoing Links 805A, 805B and 805C. Data Communications Network 800 also comprises a Host Computer 850, a Network Management System 870, a Key Management System 880, which are coupled to the Other Network Components and Links 850 via links 861, 871 and 881. In a preferred embodiment, Host Computer 850, Network Management System 870 and Key Management System 880 are also configured, like Network Routing Devices 802A, 802B and 802C, to receive and respond to the remaining encryption capacity reports sent out by Cryptos 804A, 804B and 804C. Key Management System 880 includes a key distribution system, examples of which are discussed in more detail below with reference to FIGS. 10A and 10B. Finally, the Data Communications Network 800, as shown in FIG. 8, may be coupled to and communicate with other data communications networks (shown in FIG. 8 as Other Networks 855) via links 805D and 806D. The components and links contained in Other Networks 855 may or may not be configured route, order or discard data based on remaining encryption capacity metrics.

Figure 9:
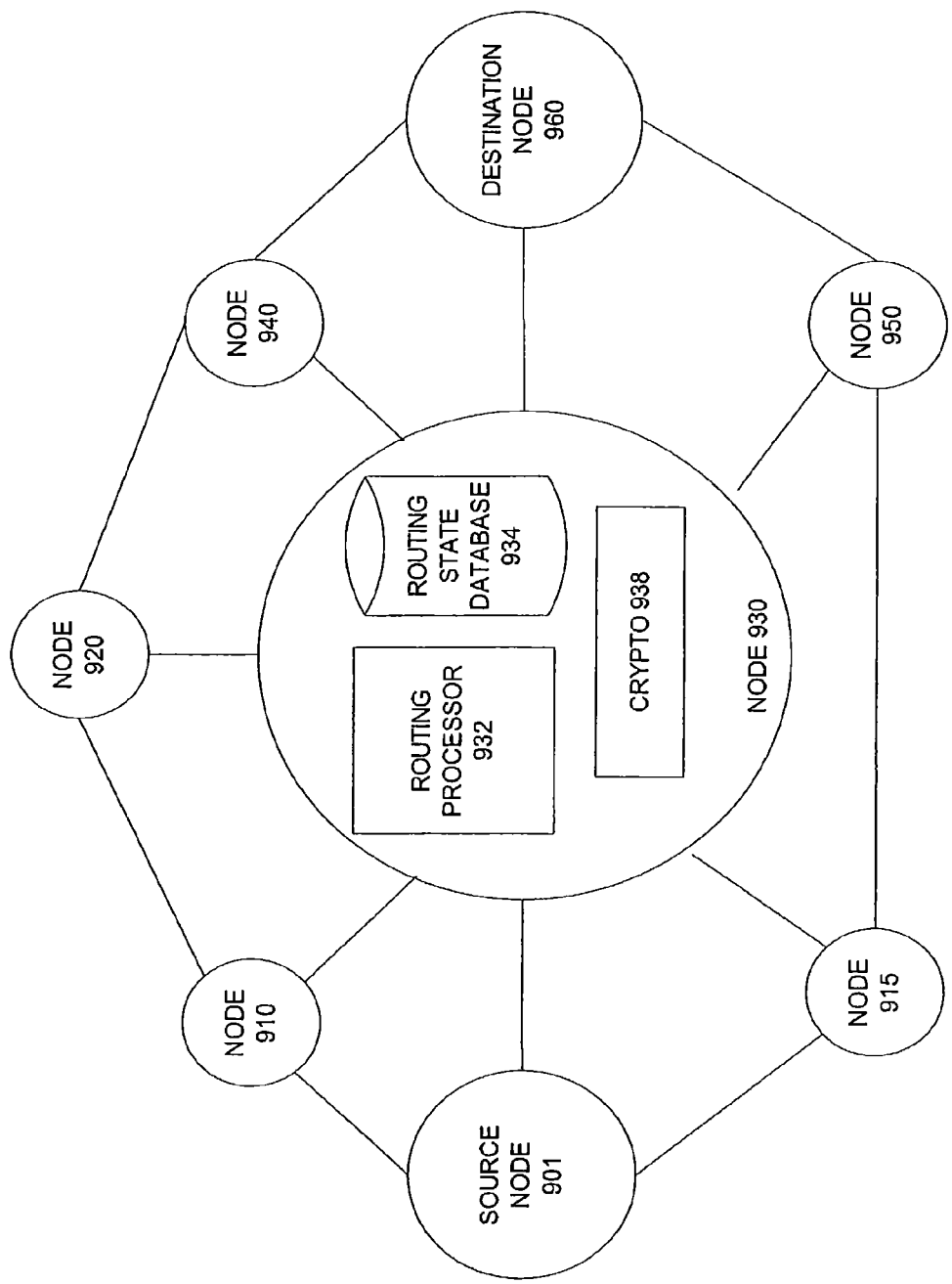
FIG. 9, which depicts another high-level block diagram of a data communications network configured to operate in accordance with the present invention, illustrates how one of the nodes may include a crypto, a routing processor and a routing state database.

FIG. 9 depicts another high-level block diagram of a data communications network configured to operate in accordance with the present invention. The data communications network shown in FIG. 9 comprises eight nodes (designated Nodes 901, 910, 915, 920, 930, 940, 950 and 960), each of which may itself comprise some kind of network component, such as a host computer, or a network router, switch or gateway to another network. Data may travel through the network shown in FIG. 9 along any number of different potential routes from Source Node 901 to Destination Node 960. For illustrative purposes, Node 930 in FIG. 9 is drawn to show it includes a Routing Processor 932, a Routing State Database 934 and a cryptographic subsystem (designated Crypto 938).

In a preferred embodiment, Routing Processor 932 in FIG. 9 is configured to perform some or all of the functions of Routing Processor 505 in FIG. 5 (discussed above). Similarly, Routing State Database 934 is configured, in a preferred embodiment, to perform some or all of the functions performed by Routing State Database 520 in FIG. 5 (also discussed above). Crypto 938 operates in accordance with Cryptos 303A and 303B, which are discussed in detail above with reference to FIG. 3. Although such details are not shown in FIG. 9, it will be appreciated by those skilled in the art that any one of the Nodes 901, 910, 915, 920, 940, 950 and 960, or all of them, may also include routing processors, routing state databases and cryptographic subsystems like the ones illustrated in Node 930, and that such configurations are encompassed within the scope of the present invention.

Figure 10A:
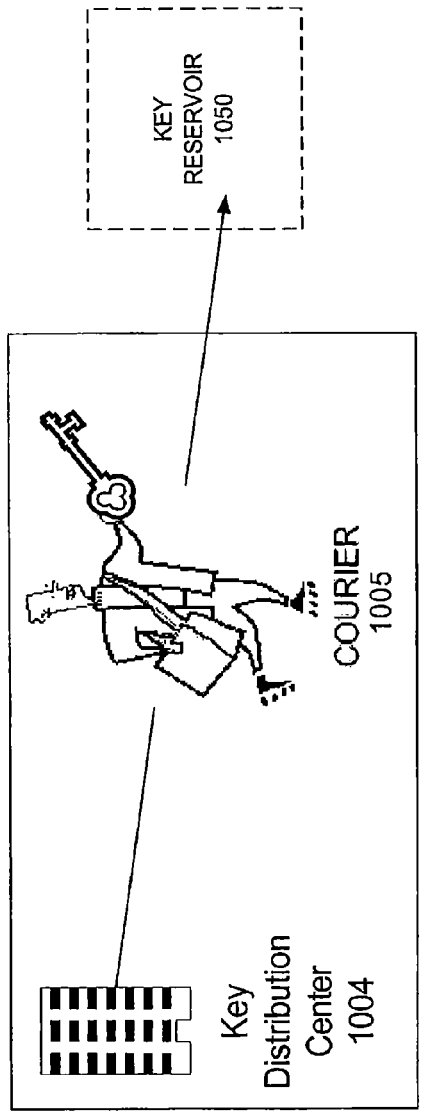
FIGS. 10A and 10B depict two kinds of key distribution systems that could be used in conjunction with embodiments of the present invention.

Various forms of key distribution systems may be used in conjunction with the present invention to provide additional keying material for the key material storage areas (key reservoirs). FIG. 10A illustrates one example of a traditional key distribution system that may be used in conjunction with the present invention. As shown in FIG. 10A, encryption keys may be distributed by having a human courier 1005 hand carry keying material from a Key Distribution Center 1004 to a Key Reservoir 1050. The keying material may also be carried from Key Distribution Center 1005 to Key Reservoir 1050 by means of a modem or local area network (LAN) connection (not shown in FIG. 10A or 10B), or by wireless transmissions such as by radio; in such techniques the new keying material itself is generally encrypted in transmission so that it cannot be read and used by adversaries. The key material generator may reside at Key Distribution Center 1004, at Key Reservoir 1050, or elsewhere within or outside of the data communications network. In a public-key based system, keys are generated at the communicating parties by means of a key agreement protocol, such as the well-known Diffie-Hellman key exchange system.

Figure 10B:
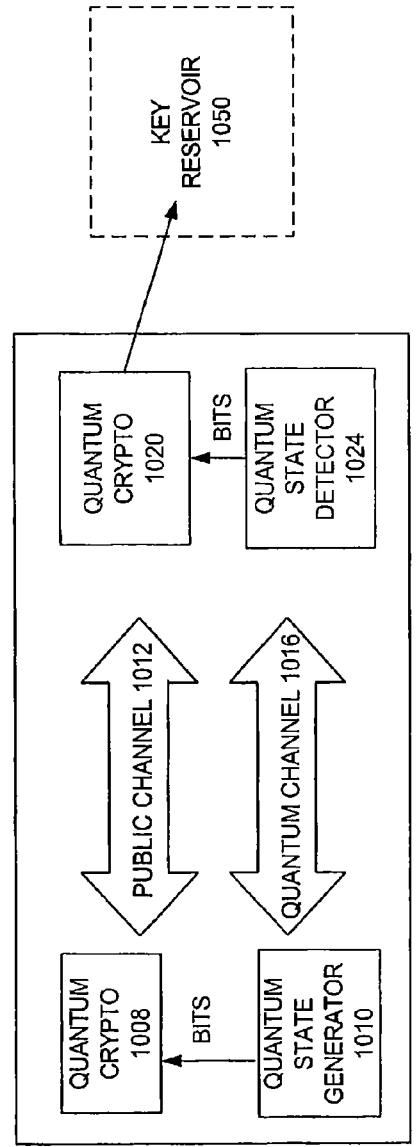

As stated above, quantum cryptographic protocol engines that employ polarized or phase-encoded photons, among other techniques, may also be used with the present invention to derive and distribute shared keying material. FIG. 10B shows an example of a quantum key distribution scheme, which involves using two communications channels: a Quantum Channel 1016, through which users send polarized or phase-encoded photons representing encryption keys; and a Public Channel 1012, through which users send ordinary messages. Since the polarized (or phase-encoded) photons moving through the quantum key transmission channel are employed for quantum key distribution (QKD), they may be called "QKD photons." A Quantum State Generator 1010 generates the polarized or phase-encoded QKD photons and transmits them, via Quantum Channel 1016, to a Quantum State Detector 1024. Quantum Channel 1016, which may comprise an optical fiber cable connection or a free space path suitable for photonic transmission, for example, isolates the QKD photons from interacting with the environment during: transmission. Public Channel 1012 may comprise a channel on any type of communication network such as a public switched telephone network, the Internet, or a wireless network. Quantum Cryptography subsystems at each end of Public Channel 1012 (designated Quantum Crypto 1008 and Quantum Crypto 1020 in FIG. 10) transmit and receive information via Public Channel 1012 sufficient to compare the polarization or phases of the QKD photons passed and received via Quantum Channel 1016.

Assume, for example, that two users, Alice and Bob, use polarized and phase encoded photons to send keys to each other over the quantum channel. An eavesdropper, Eve, may attempt to measure the photons on the quantum channel to ascertain the value of the secret encryption keys the QKD photons represent. Such eavesdropping, however, generally will induce a measurable disturbance in the photons in accordance with the "No Cloning Theorem," which states that a photon's full quantum state cannot be measured or exactly copied. Alice and Bob use Public Channel 1012 (such as by sending messages through the Internet or talking on the phone) to discuss and compare the photons sent through the quantum channel. If, through their discussion and comparison, they determine that there are no measurable disturbances in the QKD photons and, thus, no evidence of eavesdropping, then the key material distributed via Quantum Channel 1016 can be considered completely secret. It may then be used as encryption keys for communications between Alice and Bob. In the embodiment shown in FIG. 10A, Alice and Bob may be replaced (automated) with Quantum Cryptos 1008 and 1020, which may comprise, for example computers, computer programs and/or algorithms.

These are but a few examples of key distribution systems that may be advantageously configured to work with the present invention. Other key distribution systems (not described here) may be implemented by means known to those of skill in art.

The above-described preferred embodiments are intended to illustrate the principles of the invention, but not to limit its scope. Various other embodiments, modifications and equivalents to these preferred embodiments may occur to those skilled in the art upon reading the present disclosure or practicing the claimed invention. Such variations, modifications and equivalents are intended to come within the scope of the invention and appended claims.

What is claimed is:

1. A method, comprising:
    receiving, via a network device, a data stream that includes a plurality of data packets;
    receiving a report that includes an encryption capacity indicator associated with a network interface;
    determining a traffic class for a data packet in the data stream; and
    selectively undertaking at least one of
        selecting an outbound network interface link to transmit the data packet based at least in part on both the received encryption capacity indicator and the identified traffic class, and
        dropping the packet based at least in part on both the received encryption capacity indicator and the identified traffic class.

2. The method of claim 1, further comprising generating the encryption capacity indicator, the encryption capacity indicator comprising a quantitative measure representing a capacity of the network interface to encrypt subsequent data packets from the data stream.

3. The method of claim 1, further comprising generating the report, the report further comprising data representing an amount of time that has elapsed since a prior report was generated.

4. The method of claim 3, the report further comprising an amount of data encrypted since the prior report was sent.

5. The method of claim 1, further comprising:
obtaining the traffic class from at least one of a database, a policy, and a data packet; and
basing the traffic class on at least one of the following: a datagram packet content, a source address, a destination address, a protocol, a port number, a user, a department, and a computing device.

6. The method of claim 1, further comprising;
a network routing device that includes an inbound network interface; and
receiving the data stream on the inbound network interface of the network routing device.

7. The method of claim 1, further comprising:
a network routing device;
an outbound network interface;
assigning a data packet to a transmission queue, and
transmitting the data packet to the network routing device via the outbound network interface if the data packet is assigned to the transmission queue.

8. The method of claim 1, further comprising:
computing a discard probability for the data packet based on the encryption capacity indicator and the traffic class;
generating a random number; and
selectively undertaking at least one of
dropping the data packet if the discard probability is greater than or equal to the random number, and
transmitting the data packet across the network interface if the discard probability is less than the random number.

9. The method of claim 1, further comprising generating an estimate of remaining encryption capacity based on the report.

10. A device, comprising:
an inbound network interface link configured to receive a data stream that includes a plurality of data packets;
at least two outbound network interface links, wherein each of the outbound network interface links is configured to transmit at least one of the received data packets to a network routing device; and
a routing processor configured to
identify a traffic class for a data packet in the data stream,
receive an encryption capacity indicator for each of the outbound network interface links, and
select one of the outbound network interface links to transmit the data packet based at least in part on both the received encryption capacity indicators and the identified traffic class.

11. The device of claim 10, further comprising a packet classifier configured to determine the traffic class of the data packet.

12. The device of claim 10, further comprising a cryptographic subsystem configured to encrypt the data packet prior to transmitting the data packet on at least one of the outbound network interface links.

13. The device of claim 12, wherein the cryptographic subsystem is further configured to estimate an amount of remaining encryption capacity for each of the outbound network interface links, and generate an encryption capacity indicator for each of the outbound network interface links, wherein each encryption capacity indicator comprises a quantitative measure representative of a capacity of the cryptographic subsystem to encrypt subsequent data packets.

14. The device of claim 10, further comprising a packet classifier, and a policing agent coupled to the packet classifier, wherein the policing agent is configured to determine whether the data packet will be transmitted on one of the outbound network interface links based on both of the traffic class and the encryption capacity indicator.

15. The device of claim 10, further comprising a cryptographic subsystem coupled to at least one of the outbound network interface links and configured to encrypt the data packet.

16. The device of claim 10, further comprising:
a cryptographic engine configured to encrypt the data packet before the packet is transmitted across one of the outbound network interface links, wherein the encryption capacity indicator represents a quantitative measure of a capacity of the cryptographic engine to encrypt subsequent data packets.

17. A system, comprising:
a network routing device configured to receive a data packet;
a cryptographic subsystem; and
an outbound network interface link that is coupled to the network routing device and protected by the cryptographic subsystem,
wherein the network routing device is further configured to:
receive an encryption capacity indicator from the cryptographic subsystem, wherein the encryption capacity indicator includes a quantitative measure representative of a capacity of the cryptographic subsystem to encrypt subsequent data packets;
at least selectively undertake one of
transmit the data packet across the outbound network interface link based at least in part on both an encryption capacity indicator and an identified traffic class; and
drop the packet based at least in part on both the received encryption capacity indicator and the identified traffic class.

18. The system of claim 17, further comprising a database for storing a report, wherein the report includes the encryption capacity indicator.

19. The system of claim 17, further comprising at least one other network routing device, wherein the encryption capacity indicator is conveyed to the at least one other network routing device.

20. The system of claim 17, wherein the cryptographic subsystem generates a report that includes the encryption capacity indicator and conveys the report in response to at least one of the following: an occurrence of a specified event; a specified condition for the outbound network interface link; a time when an amount of key material in a key storage area reaches a specified level; and a time when the key material has been present in the key storage area for a specified time period.

21. The system of claim 17, further comprising a statistical analyzer configured to generate an estimated remaining encryption capacity based on the encryption capacity indicator.

22. The system of claim 17, further comprising:
a source network element;
a target network element in communication with the source network element;

at least two data communication paths between the source network element and the target network element, wherein at least one of the data communication paths includes the network routing device, the outbound network interface link, and the cryptographic subsystem; and a routing processor that determines, based on the encryption capacity indicator, which one of the at least two communication paths will be used to transmit the data packet from the source network element to the target network element.

23. The system of claim 17, wherein the encryption capacity indicator is conveyed using at least one of the following: Open Shortest Path First (OSPF) Protocol; Constraint-based Routing Label Distribution Protocol (CR-LDP); Intermediate System to Intermediate System (IS-IS) Protocol; Resource Reservation Protocol (RSVP); Border Gateway Protocol (BGP); Simple Network Management Protocol (SNMP); Synchronous Optical Network (SONET) protocol; and Internet Control Message Protocol (ICMP).

* * * * *